United States Patent
Keller-Tuberg

(10) Patent No.: US 7,272,652 B1
(45) Date of Patent: Sep. 18, 2007

(54) FACILITATING ACCELERATED PROCESSING OF INTERNET GROUP MANAGEMENT PROTOCOL MESSAGES

(75) Inventor: Stefan Keller-Tuberg, Raleigh, NC (US)

(73) Assignee: Alcatel Lucent, Paris (FR)

( * ) Notice: Subject to any disclaimer, the term of this patent is extended or adjusted under 35 U.S.C. 154(b) by 1039 days.

(21) Appl. No.: 10/136,581

(22) Filed: Apr. 30, 2002

(51) Int. Cl.
G06F 15/173 (2006.01)
G06F 15/16 (2006.01)

(52) U.S. Cl. ........................ 709/227; 709/223

(58) Field of Classification Search ........ 709/223–232; 370/390, 396
See application file for complete search history.

(56) References Cited

U.S. PATENT DOCUMENTS

| | | | | |
|---|---|---|---|---|
| 5,973,724 | A * | 10/1999 | Riddle | 348/14.07 |
| 6,262,982 | B1 * | 7/2001 | Donahue et al. | 370/352 |
| 6,721,318 | B1 * | 4/2004 | Cai et al. | 370/390 |
| 6,781,999 | B2 * | 8/2004 | Eyuboglu et al. | 370/399 |
| 6,826,612 | B1 * | 11/2004 | Bosloy et al. | 709/227 |
| 2002/0126698 | A1 * | 9/2002 | Deshpande | 370/467 |
| 2005/0117576 | A1 * | 6/2005 | McDysan et al. | 370/389 |

FOREIGN PATENT DOCUMENTS

WO WO98/48343 10/1998

OTHER PUBLICATIONS

Kaur, et al.; Multicast Support for Mobile IP Using a Modified IGMP; IEEE Conference on Wireless Communications and Networking; Sep. 1999; pp. 948-952.
Liao, et al., Receiver-initiated Group Membership Protocol (RGMP): A New Group Management Protocol for IP Multicasting; Seventh International Conference on Network Protocols: 1999: pp. 51-58.
Fenner, et al.; Internet Group Management Protocol, Version 2; IETF RFC 2236; Nov. 1997; pp. 1-24.

* cited by examiner

Primary Examiner—Glenton B. Burgess
Assistant Examiner—Sean Reilly
(74) Attorney, Agent, or Firm—Raymond M. Galasso, PC; Bobby D. Slaton

(57) ABSTRACT

Processing Internet Group Management Protocol (IGMP) messages in which a response-mode determination process is facilitated after receiving an IGMP Membership Report designating a requested multipoint leaf connection, where in a proactive expedited leave process is performed in response to determining that implementation of the requested multipoint leaf connection is required and that required network resources are unavailable. A multicast leaf connection implementation process for implementing the requested multipoint leaf connection is performed in response to determining that required network resources are available.

22 Claims, 4 Drawing Sheets

FACILITATING ACCELERATED PROCESSING OF INTERNET GROUP MANAGEMENT PROTOCOL MESSAGES

FIELD OF THE DISCLOSURE

The disclosures made herein relate generally to Internet Group Management Protocol (IGMP) and more particularly to facilitating a processing of IGMP messages.

BACKGROUND

The Internet Group Management Protocol (IGMP) is described in Request For Comments document No. 1112 (hereinafter referred to as RFC-1112 and as IGMP version 1) and in Request For Comments document No. 2236 (hereinafter referred to as RFC-2236 and as IGMP version 2). Through the use of various IGMP messages, a requesting system (i.e. an end user download device) is able to facilitate joining and leaving one or more multicast groups. Thus, the requesting system device may selectively receive one or more streams of multicast information.

Conventional operation of the IGMP RFC-2236 (IGMP Version 2) makes provisions for a multicast routing device to automatically determine when multicast streams are no longer required. Specifically, IGMP Version 2 allows multicast routers to determine when no hosts on a particular interface need to receive one or more multicast streams any more. When a multicast router has reached such a determination, the multicast router may take steps to turn the multicast stream off.

To this end, multicast routers query each of their attached networks periodically to determine which multicast streams are still required by one or more hosts on that network. If the multicast router does not receive a response for a particular multicast stream, it retransmits the query one or more times before assuming that no hosts require that particular multicast stream any more. These retransmissions are to account for loss or error in one of the query messages or its responses. The multicast router will only turn off a multicast stream on a particular network when it is sure that there are no longer any hosts on that network wanting to continue receiving it. The interval between the last host no longer requiring a stream and the time at which the multicast router recognizes this is called "the leave latency".

As a partial improvement to the leave latency, hosts may issue a special "IGMP Leave" message. The IGMP Leave message is intended to cue the multicast router into commencing the check for remaining hosts. The IGMP Leave message reduces the average leave latency for a particular multicast stream somewhat (by prompting the router to immediately commence the query cycle for that group). However, the IGMP Leave message does not substantially reduce the leave latency.

This conventional IGMP Version 2 Leave message mechanism is relatively slow compared with the speed that a subscriber (e.g. a video service subscriber) would "zap" from channel to channel (i.e. change channels). This conventional IGMP Version 2 Leave message mechanism typically takes as much as tens of seconds to confirm that a stream is no longer required. A channel zap should be as fast as practical and certainly is no longer than about one second.

A limitation of IGMP Version 2 is that when any terminal issues an IGMP Leave message, the multicast router is typically not sure whether there are any other subscribers receiving the same multicast stream. Accordingly, the multicast router cannot immediately stop transmitting the multicast stream. Instead, IGMP Version 2 facilitates broadcast of a group specific membership query and then waits to see if any other hosts respond. If no other terminals respond within a prescribed timeout and retransmit period, the multicast router may then stop transmission of the multicast stream.

For some Digital Subscriber Line (DSL) applications, this conventional IGMP Version 2 behaviour is not completely acceptable due to the capacity of a DSL line (or a subtending DSLAM link) being finite. There are several problems caused by such finite capacity. For example, when a subscriber download device starts quickly zapping through channels, several zaps could be received at an IP Gateway in the time it takes for a conventional IGMP version 2 implementation to query a particular multicast router for other group members and then remove the unnecessary groups. If the IP Gateway cannot facilitate deletion of a group that is no longer required quickly enough, the capacity of the DSL line will quickly be exhausted with the channels that the subscriber has zapped past, but that are still active. A point will be reached where the subscriber cannot zap to another channel because their DSL line is completely full of traffic from the channels that the subscriber has already zapped past.

Another limitation of IGMP Version 2 is that IGMP Version 2 requires that all hosts and routers revert to IGMP Version 1 mode whenever an IGMP Version 1 format message is seen on the network interface. IGMP Version 1 does not include the Leave message. Accordingly, leave latencies are therefore longer (on average) than for IGMP Version 2.

Therefore, facilitating processing of IGMP messages in a manner that overcomes time and resource limitations associated with conventional implementations of IGMP is useful.

DETAILED DESCRIPTION OF THE FIGURES

The disclosures made herein relate to various aspects of facilitating processing of IGMP messages in an accelerated manner. Such accelerated processing of IGMP messages is advantageous in applications such as, for example, a video over DSL multicast service such that limitations associated with leave latency can be minimized. To this end, an IP Gateway providing IGMP controlled multicast services tracks members of a particular multicast group on a host-by-host basis for each DSL subscriber. Accordingly, by intrinsically knowing which specific hosts connected to a particular DSL line are members of a particular multicast group, the IP Gateway can make informed decisions and inferences about continuing or discontinuing distribution of particular streams and can facilitate accelerated processing of IGMP messages and accelerated changes in multicast group membership status in accordance with such various aspects of the disclosures made herein. One example of such accelerated processing includes quickly determining whether a multicast flow can be stopped in order to save network resources or to recover enough resources to allow another multicast connection to be established.

An advantage of IGMP Version 2 over its predecessor IGMP Version 1 is the addition of a capability for hosts to signal an associated multicast router(s) that they wish to leave a multicast group. Using the leave message, the router is often able to cease transmission of one or more designated multicast streams at an earlier time, thus freeing network resources sooner for other multicast connections.

IGMP Version 2 states that any multicast router receiving an IGMP Version 1 Membership Report must, for a certain time following, ignore all IGMP Version 2 Leave messages. In accordance with embodiments of the disclosures made herein, the multicast router ignores this requirement. Specifically, the IP Gateway should receive IGMP Version 2 Leave messages and process them normally regardless of the presence of IGMP Version 1 hosts on the same LAN. Effectively, the IP Gateway supports IGMP Version 2 but is tolerant of the presence of one or more IGMP Version 1 hosts without reverting to IGMP version 1 mode.

It is contemplated that even if the IP Gateway remains in IGMP version 2 mode, some other devices on the subscriber network that support IGMP Version 2 may still revert to IGMP Version 1 when they receive an IGMP Version 1 message. Accordingly, to take advantage of aspects of the behaviour disclosed herein for processing messages in accordance with IGMP Version 2 even in the presence of IGMP Version 1 messages, some or all hosts on the network must also disregard the stated requirement of IGMP version 2 for reverting back to IGMP Version 1. In at least one embodiment of the disclosures made herein, a subscriber download apparatus (e.g. a subscriber set top box) will also process messages in accordance with IGMP Version 2 even in the presence of IGMP Version 1 messages.

Figure 1A:
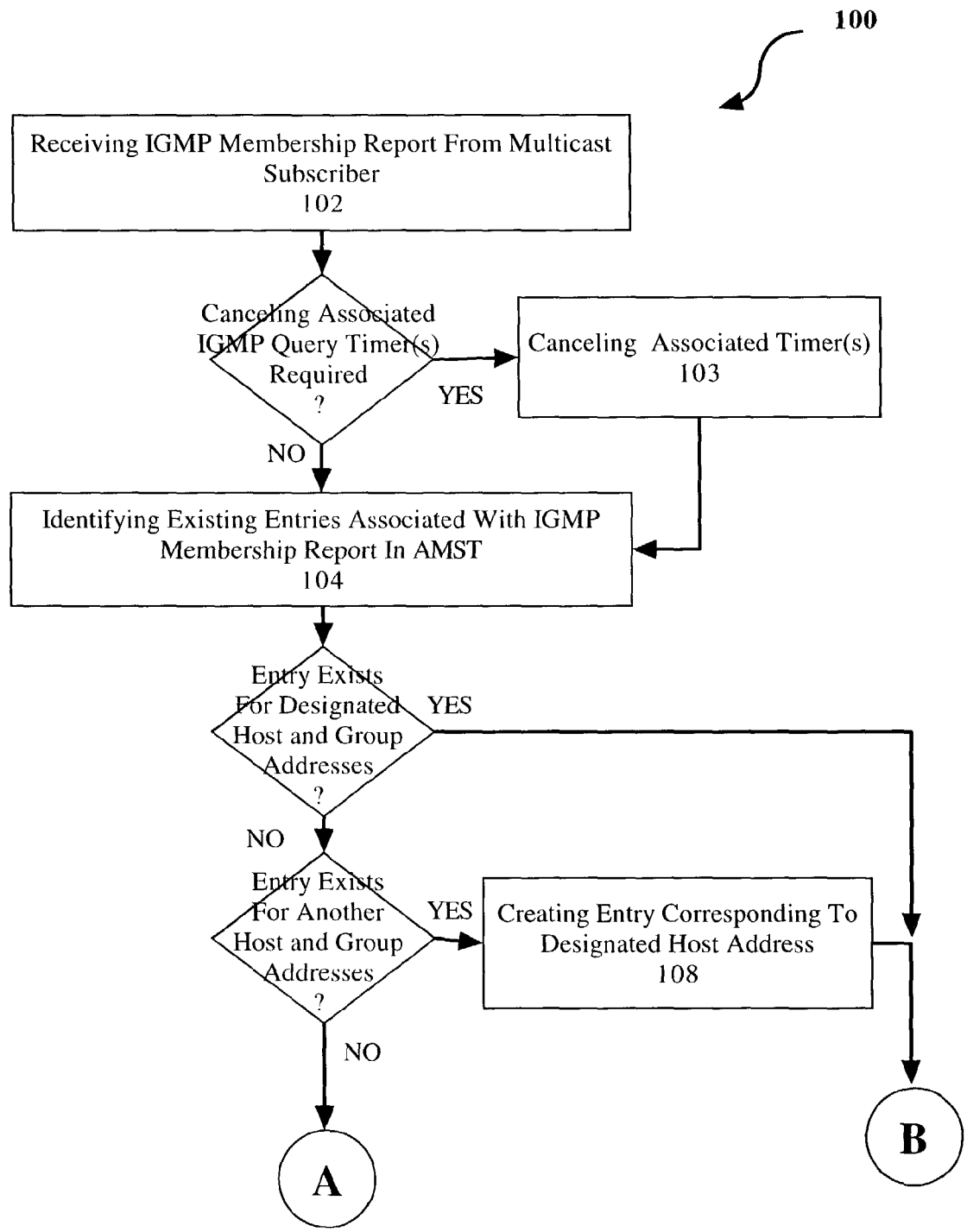
FIG. 1A and FIG. 1B are a flow chart view depicting a method for facilitating processing of IGMP messages in accordance with an embodiment of the disclosures made herein.
Figure 1B:
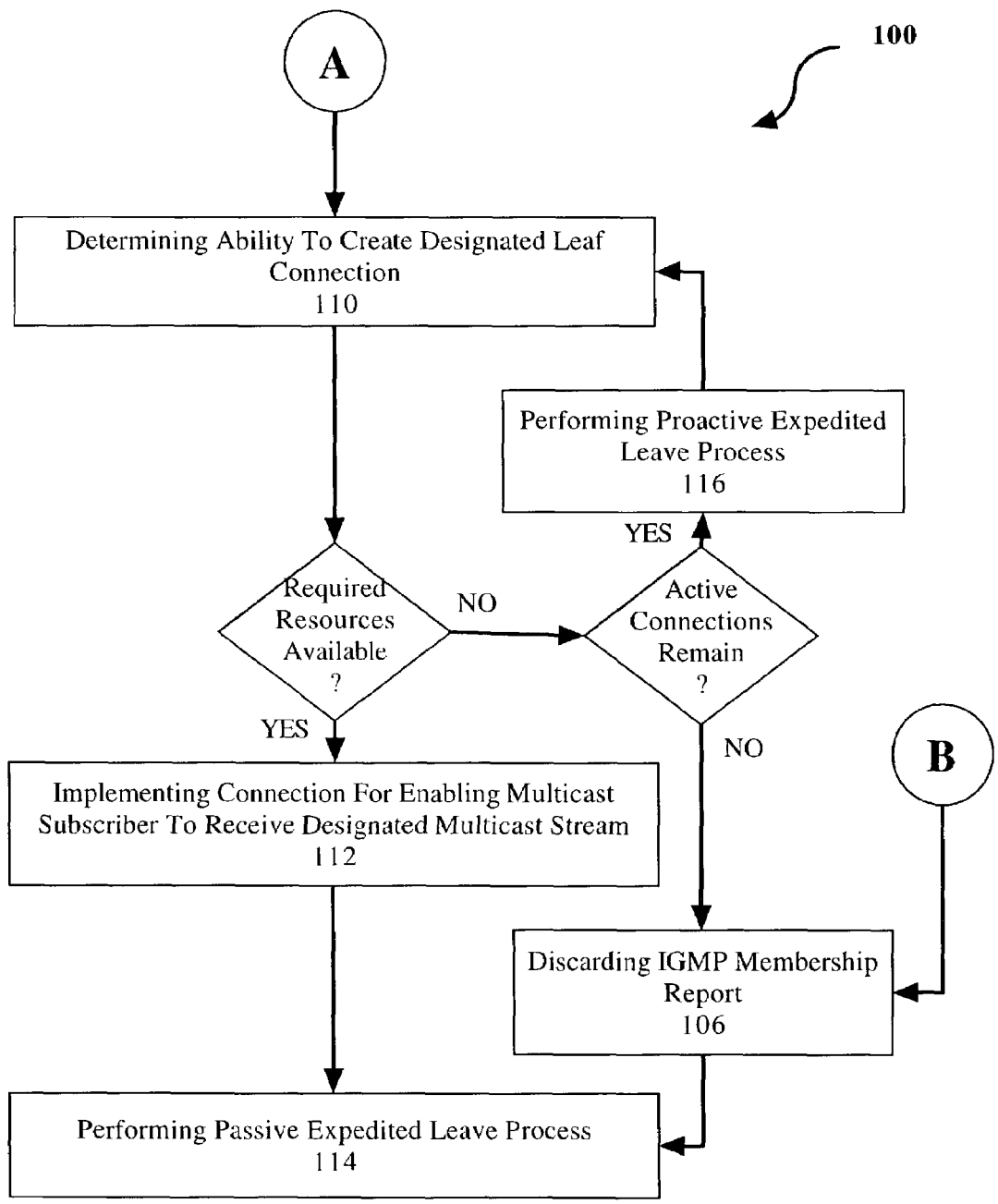

Turning now to the figures, FIG. 1A and FIG. 1B depict a method 100 for facilitating processing of IGMP Membership Report messages in accordance with embodiments of the disclosures made herein. An IP gateway is an example of a network element capable of facilitating the operations and processes of the method 100. An operation 102 is performed for receiving an IGMP Membership Report from any of the hosts accessible via a particular multicast subscriber's network connection. In response to receiving an IGMP Membership Report, the IP Gateway must first check to see whether it has an active timer for the designated multicast group. If so, an operation 103 for cancelling the associated timer(s) is performed.

According to the IGMP standards RFCs 1112 and 2236, the IGMP Membership Report message is used to convey either of two meanings. In one case, a Membership Report conveys a request for implementing a designated multicast leaf connection corresponding to a respective multicast stream. In a second case, which assumes that a host has previously sent a Membership Report for a particular group, a subsequent Membership Report conveys the desire of at least one host on the subscriber's network to remain a member of the specified group. This second case is triggered by the IP Gateway device sending an IGMP General Query or an IGMP Group Specific Query soliciting all hosts to affirm their group membership status. In conjunction with having sent a Query, the IP Gateway device is assumed to have started a separate timer for each active multicast group and for any such timer which expires prior to receipt of an associated Membership Report, it is reasonable for the IP Gateway to assume that no further hosts on that subscriber's network desire to continue to receive that particular multicast stream.

After cancelling any associated timers or where no associated timers are present, an operation 104 is performed for identifying existing entries associated with the IGMP Membership Report within an Active Multicast Sessions Table (AMST). The Active Multicast Sessions Table is an example of a reference table identifying all active multicast sessions known to the IP Gateway. The entries in the Active Multicast Sessions Table represent occurrences of existing multicast connections to specific hosts. At least one embodiment of identifying existing entries includes searching the table for an entry comprising a designated host, a designated Class D address and a designated multicast subscriber identifier. It is contemplated herein that types of designated multicast subscriber identity include an interface or a port of the IP Gateway. Searching the Active Multicast Sessions Table and assessing existing entries of the Active Multicast Sessions Table represent determining existing occurrences of existing connections.

There are several possible outcomes from operation 104. When an entry exists for the host, Class D address and multicast subscriber identity designated in the IGMP Membership Report, the designated multicast stream (i.e. multicast leaf connection) is presumed to be already active and the host is presumed to be already registered as a member of the group. Accordingly, an operation 106 is performed, such as by an IP Gateway, for disregarding and/or discarding the IGMP Membership Report as it is deemed to be redundant. Alternately, when an entry exists in the Active Multicast Sessions Table for the Class D address and multicast subscriber but for a different host than designated in the IGMP Membership Report, the designated multicast stream (i.e. multicast leaf connection) stream is presumed to be already active and a second or subsequent host is attempting to join the same group for which the different host is already registered. Accordingly, an operation 108 is performed for creating another entry in the Active Multicast Sessions Table followed by performing the operation 106 for disregarding and/or discarding the IGMP Membership Report. By creating another entry in the Active Multicast Sessions Table the designated host is now registered with respect to the designated multicast leaf connection. Finally, if the Active Multicast Sessions Table contains no entries for the requested multicast group for any of the subscriber's hosts, it is assumed that the designated multicast leaf connection needs to be implemented. Accordingly, an operation 110 is performed for determining an ability to create the designated multicast leaf connection.

In the case that the operation for determining an ability to create the designated multicast leaf connection is required, after confirming that required resources are available for implementing the designated multicast leaf connection, an operation 112 is performed for implementing the designated multicast leaf connection for enabling the designated subscriber to receive a respective multicast stream. At some point in time after implementing the designated multicast leaf connection, a passive expedited leave process 114 is performed. The passive expedited leave process 114 is discussed in greater detail below.

As part of the operation for implementing the designated multicast leaf connection, a new entry is created in the Active Multicast Sessions Table denoting the new membership. Confirming that required resources are available, that subscriber's service profile permits them to join the designated multicast stream (i.e. join a designated multicast group) and that the designated multicast stream is available at a multicast router associated with the IP Gateway are examples of confirming an ability to implement a designated multicast leaf connection.

In the event that resources are not available for implementing the designated multicast leaf connection, a check is performed to determine whether any other multicast connections to that host on that subscriber's network is candidate for termination. If so, a proactive expedited leave process 116 is performed in an attempt to recover sufficient resources for enabling the designated multicast leaf connection to be implemented. For as many times as the designated multicast connection continues to be denied and that active connections remain, the proactive expedited leave process 116 continues to be implemented and corresponding attempts made to establish the designated multicast connection until no more multicast connections exist for which the designated host is the sole member.

The proactive expedited leave process is an example of a process capable of recovering network resources and is discussed in greater detail below. The process is referred to herein as being proactive because, in the absence of a Leave indication from a subscriber host, the IP Gateway is actively searching for connections to terminate and terminating them directly to immediately recover resources. In at least one embodiment of the proactive expedited leave process, the proactive expedited leave process is performed based upon information contained solely in the Active Multicast Sessions Table. Where sufficient resources are successfully recovered, the method 100 proceeds from the operation 110 for determining an ability to create the designated multicast leaf connection to the operation 112 for implementing the designated multicast leaf connection.

In order to sensibly accommodate the situation where one host is quickly zapping from one class D address to the next and so on, it is contemplated herein that the passive expedited leave process, may be performed whenever any Membership Report is received, even if resources are already available for creating the connection specified in the Membership Report. The passive expedited leave process is an example of a process capable of recovering network resources at a later instant in time but sooner than would have been possible if following regular IGMP procedures. Most notably is IGMP version 1, which does not provide a mechanism for a host to indicate a preference to stop receiving a particular multicast group. In at least one embodiment of the passive expedited leave process, the passive expedited leave process is performed based upon information contained solely in the Active Multicast Sessions Table.

It is preferred that a proactive expedited leave should always trigger a passive expedited leave (i.e. cause the IP Gateway to send a general query). The reason for this is to provide an opportunity for any host that's had its multicast session abruptly terminated without notice to ask for the terminated group to be re-instated. That is, the host with the terminated session will receive the query. As it still wants to be a member of the designated multicast group, it will respond to the query with an IGMP Membership Report. The IP Gateway will respond to that IGMP Membership report as if it was a new request to join the designated multicast group.

Figure 2:
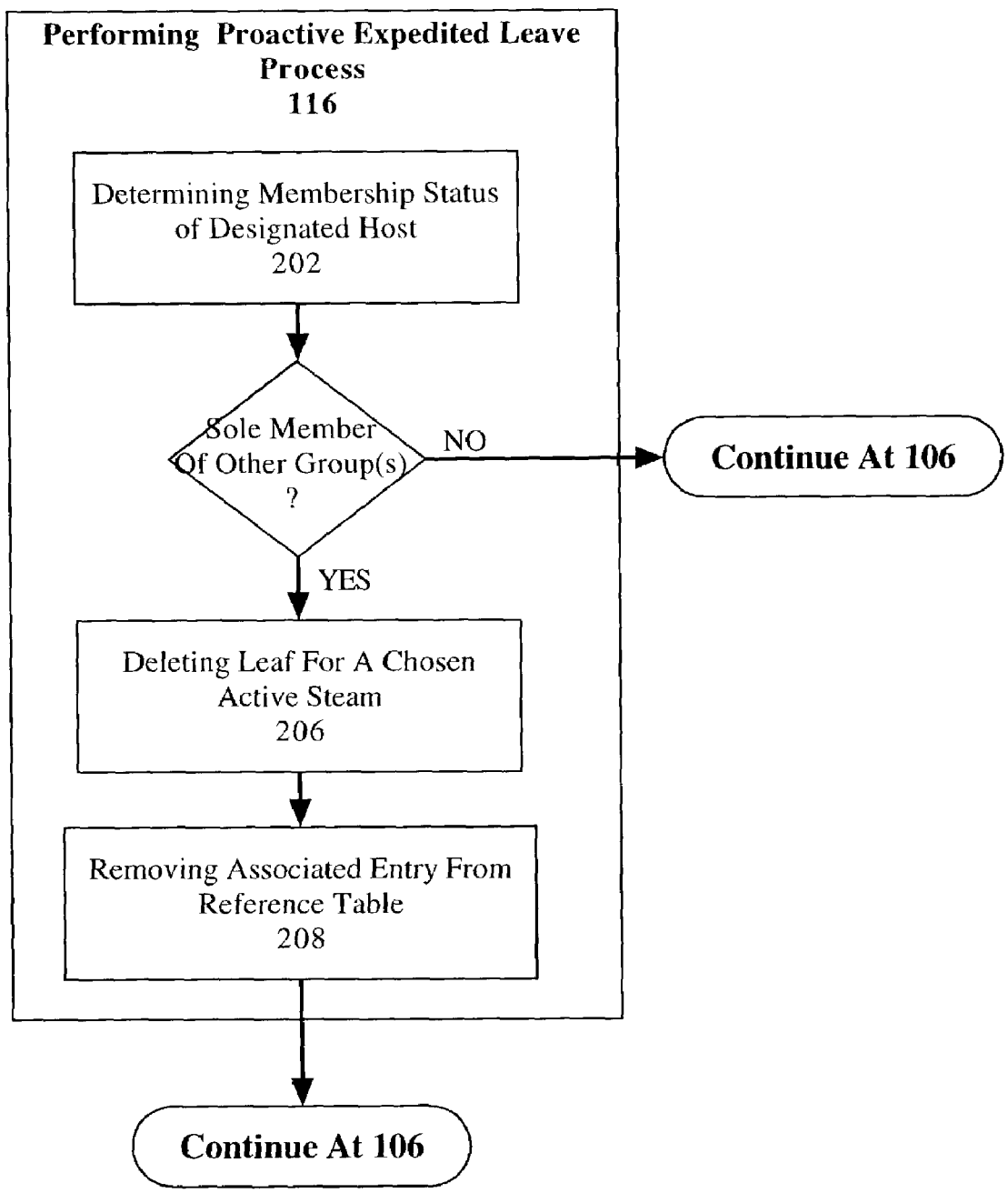
FIG. 2 is a flow chart view depicting a proactive expedited leave process in accordance with an embodiment of the disclosures made herein.

FIG. 2 depicts an embodiment of the proactive expedited leave process 116 discussed above. As discussed above, one example of when the proactive expedited leave process is facilitated is whenever the IP Gateway attempts to create a new leaf (in response to a new Membership Report) and the DSLAM or IP Gateway Connection Admission Control (CAC) denies the request. Examples of causes for the denial include the subscriber having no free virtual connections (VCs) available for supporting another multipoint leaf connection as all VCs are allocated to the multipoint service are currently being used for other multicast connections and the connection not being capable of being implemented because there is insufficient free capacity available on the subscriber's DSL line to support a newly requested multicast connection.

As depicted in FIG. 2, facilitating the proactive expedited leave process includes an operation 202 for determining membership status of a host designated in an IGMP Membership Report (i.e. the designated host). Looking up entries in the Active Multicast Sessions Table is an example of determining such membership status. When the designated host is not the sole member of one or more other multicast groups, the process proceeds to the operation 106 (FIG. 1) for disregarding and/or discarding the IGMP Membership Report. When the designated host is the sole member of one or more other multicast groups, an operation 206 is performed for deleting a multicast leaf connection corresponding to a chosen (e.g. a highest bit rate) active stream of the designated host, followed an operation 208 being performed for removing (i.e. deleting) a corresponding entry in the Active Multicast Sessions Table for the highest bit rate stream. Other schema to select the stream to be deleted may be contemplated, including, but not limited to, selecting the lowest bit rate stream, selecting the most recently created stream or selecting the stream that was created first.

It is contemplated herein that in freeing resources using the proactive expedited leave approach, the IP Gateway need not re-establish connections that were deleted as it is assumed that the end user application that sent a IGMP Membership Report for the deleted multicast connections no longer requires the former stream(s). Such an assumption is particularly appropriate when the IGMP Membership Report corresponds to a 'channel zap' by the multicast subscriber. This iterative approach to freeing resources is particularly useful when the operator has configured a multicast subscriber's DSL line to operate at a minimum downstream throughput of the maximum multicast stream rate. If the end user application formerly receiving a stream which was proactively deleted wishes to reinstate the deleted multicast connection, it will be given the opportunity to assert its requirement in response to a General Membership Query or a Group Specific Membership Query which is sent as a consequence of performing the operation 116 for facilitating a proactive expedited leave process.

It is contemplated herein that whenever an IP Gateway receives an IGMP Membership Report from a particular host, it should check to see whether the host that sent the IGMP Membership Report is also a sole member of at least one other class D group. If the host in fact is a member of another group, there is a chance that a proactive expedited leave process should be facilitated because of one or more conditions existing. Examples of such conditions include an IGMP Leave message corresponding to the IGMP Membership Message being lost, the host issuing the IGMP Membership Report being an IGMP Version 1 host (thus not being capable of sending an IGMP Leave message) and an IGMP Version 1 host causing one of more other IGMP Version 2 hosts to revert to IGMP Version 1 (thus no longer transmitting IGMP Leave messages).

It is further contemplated herein that whenever the IP Gateway receives a Membership Report from a host which is also the sole member on that DSL line of at least one other group (as designated in the Active Multicast Sessions Table), the IP Gateway should launch a separate Group Specific Membership Query addressed to each of those other groups. Furthermore, the IP Gateway may also be required to send one or more Group Specific Membership queries in accordance to the proactive expedited leave functionality disclosed herein. As an alternate to sending a Group Specific Membership Query, the IP Gateway could send a General Membership Query.

In one embodiment, an IP Gateway will launch an IGMP Group Specific Membership Query on a designated multicast subscriber's DSL connection. In this embodiment, such a query will be issued using the following parameters:
MaxResponseTime=1 second;
LastMemberQueryCount=2; and
LastMemberQueryInterval=1.25 seconds, allowing small additional time for a finite and non zero DSL round trip delay).

In this embodiment, the "MaxResponseTime" field of the IGMP Group Specific Membership Query is set to a small value in order to quickly solicit a response. Such a short time is acceptable in a DSL environment because the maximum expected number of terminals on a subscriber network is small and there is no short-term correlation in IGMP activity from one DSL subscriber to another. If one or more IGMP Membership Reports are received, the IP Gateway can assume that it should not drop the designated leaf connection to the DSL subscriber in question. For robustness, the IP Gateway should process the one or more IGMP Membership Reports in accordance with the disclosures made herein. If one or more IGMP Membership Reports are not received, the IP Gateway can assume that there are no further members of the designated multicast group. At the conclusion of the last LastMemberQueryCount interval, the IP Gateway may immediately drop the designated multicast leaf connection and clear the logged members of that group via deleting a corresponding entry in the Active Multicast Sessions Table.

In other embodiments, alternate values can be contemplated for MaxResponseTime, LastMemberQueryCount and LastMemberQueryInterval.

Figure 3:
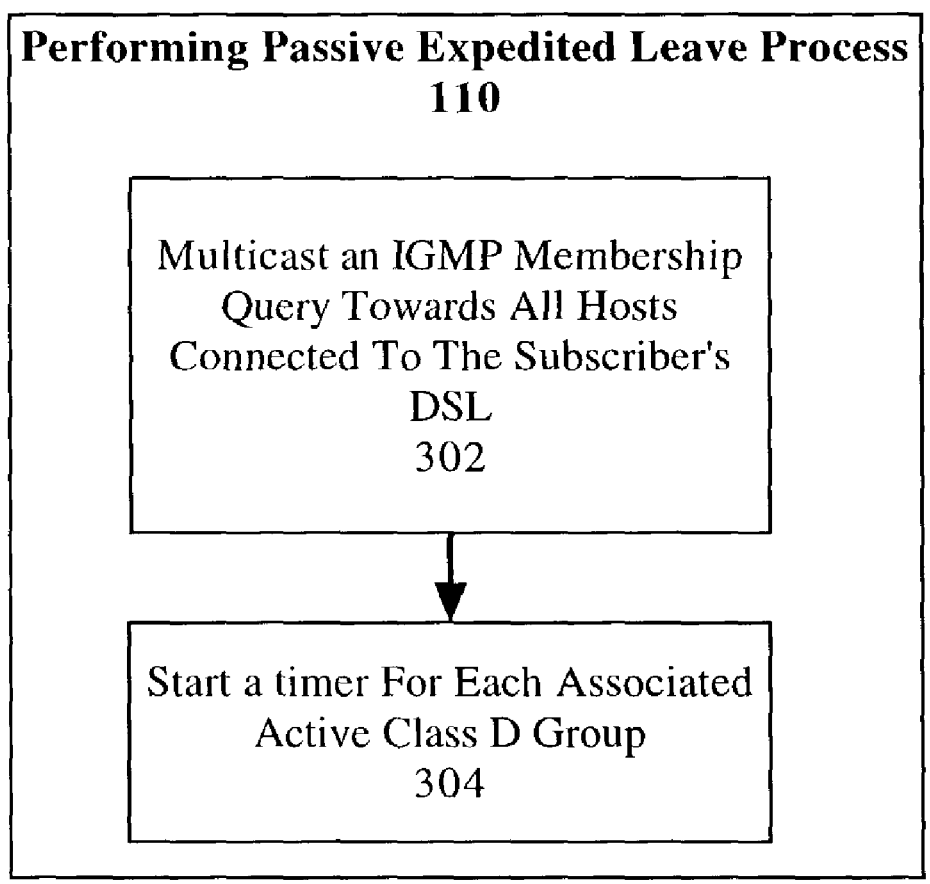
FIG. 3 is a flow chart view depicting a passive expedited leave process in accordance with an embodiment of the disclosures made herein.

FIG. 3 depicts an embodiment of the passive expedited leave process 114 discussed above. The depicted embodiment of the passive expedited leave process 114 includes an operation 302 is performed for multicasting an IGMP Membership Query (e.g. a General Membership Query or a Group Specific Membership Query) towards all hosts connected to the subscriber's digital subscriber line. Following the operation 302 being performed for multicasting an IGMP Membership Query, an operation 304 is performed for starting a timer for each associated group (e.g. Class D) address.

Multicast routers such as the IP Gateway are required to periodically poll all hosts to ask them if they wish to continue to receive the multicast groups they are presently receiving. Either the "General Membership Query" or the "Group Specific Membership Query" may be used by the IP Gateway to initiate this poll. When the Membership Query is sent out, the IP Gateway (or any common implementation) starts a timer to measure the Membership Query interval and at the same time, another variable, a counter, is set to a small number to represent the number of query attempts the gateway will invoke prior to assuming that there are no longer any recipients for the group.

Commonly, separate timers are started for each currently active group. If any one of these timers expires before being cancelled, the associated down counter is decremented. If the counter has not yet decremented to zero, the gateway will resend a Group Specific Membership Query (even if the first query was a General Query) to allow for the small possibility that the original Query or its response were lost. If on the other hand, the counter decrements to its zero level, it signifies that the IP Gateway may discontinue forwarding that associated class D stream (i.e. the fact that no host responded to the original query or its retransmissions indicates that no host needs to continue receiving the stream).

The behavior of IGMP documented in corresponding standards requires multicast routers to periodically initiate queries. Thus, periodically, resources that are no longer required, but are presently being consumed, will be freed. The passive expedited leave process described herein specifically initiates this process when the multicast router receives a membership report. This specific functionality is not described in the standards associated with IGMP but is perfectly acceptable behavior within the meaning and intention of the available message set. The proactive expedited leave process disclosed herein first deletes the connection (stops the multicast flow) but then launches into precisely the same query mechanism to offer all hosts the opportunity to re-ask for the connection which was just deleted.

Through the implementation of the passive expedited leave process, an IP Gateway need never wait the standard IGMP version 2 leave interval when the final member leaves a group. This approach has the good side effect that capacity is immediately freed on that subscriber's DSL line (and potentially on a multicast router subtending link) and this capacity can be immediately reused for other applications such as FTP download, etc.

While it is expected that operators will normally wish to deploy IP Gateway multicast services with the Passive and Proactive Expedited Leave functionality enabled, it is contemplated herein that the passive and proactive expedited leave functionality may be functionality configurable. In one embodiment, a switch is provided to enable or disable the expedited leave capabilities/functionalities. Such a switch may be designed to be configurable on a per IP Gateway basis, per virtual router basis, and/or per end user basis. When passive and proactive expedited leave functionality is disabled, the IP Gateway should behave in accordance with IGMP version 2 (i.e. RFC-2236).

Referring now to data processor programs in accordance with an embodiment of the disclosures made herein, a data processor program controls at least a portion of the operations associated with facilitating the methods, processes and operations disclosed herein. The term data processor program is defined herein to refer to computer software, data processor algorithms or any other type of instruction code capable of controlling operations associated with a data processor. A microprocessor, microcontroller, microcomputer, digital signal processor, state machine, logic circuitry, and/or any device that manipulates digital information based on operational instruction, or in a predefined manner are examples of a data processor. A network element (e.g. an IP Gateway, a multicast routing device, Digital Subscriber Line Access Multiplexor, subscriber download device, etc.) may individually or jointly comprise such a data processor and a data processor program in accordance with embodiments of the disclosures made herein. Such a network element is an example of an apparatus comprising a data processor module (e.g. a circuit including at least one data processor), memory connected to the data processor module and a data processor program accessible by the data processor module from the memory.

A data processor program in accordance with an embodiment of the disclosures made herein is processible by a data processor of a network element. In one embodiment, the data processor program is resident on an IP Gateway and is accessible from memory (e.g. RAM, ROM, virtual memory, etc) of the IP Gateway. In another embodiment, the data processor program is resident on and accessible from a peripheral data storage apparatus such as a diskette, a compact disc, an external data storage device or the like. It is contemplated herein that the data processor program may be initially accessed via the data storage apparatus and to thereafter accessed via memory of an associated system.

A data processor program accessible from memory and/or a data storage apparatus and processible by a data processor is defined herein as a data processor program product. It is contemplated herein that the data processor program product may comprise more than one data processor program each accessible from respective apparatuses. It is further contemplated herein that each one of a plurality of data processor programs may be accessed and processed by different respective ones of a plurality of data processors. For example, a data processor of an IP Gateway and a data processor of a multicast router access a first data processor program and a second data processor program, respectively, from memory of the IP Gateway and from memory of the multicast router, respectively.

In accordance with embodiments of the disclosures made herein, IGMP Version 2 message exchange remains substantially unchanged. Because the message exchange remains "standardized" in accordance with IGMP Version 2 (RFC-2236), existing terminals that implement IGMP Version 2 will still work predictably with the modified IGMP behaviour as disclosed herein. However by modifying the IP Gateway (or multicast router) in accordance with this disclosure, the leave latency will be vastly improved and will meet zapping latency required for a video service. Furthermore, IGMP message processed in accordance with embodiments of the disclosures made herein may be practiced in association with unidirectional multicast services such as video or file download.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical, chemical and electrical changes may be made without departing from the spirit or scope of the invention. For example, functional blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for processing Internet Group Management Protocol (IGMP) messages, comprising:
   facilitating a response-mode determination process after receiving an IGMP Membership Report designating a requested multipoint leaf connection, comprising;
   determining whether a multicast stream designated in the IGMP Membership Report is already active;
   disregarding the IGMP Membership Report in response to determining that the multicast stream is active via a host designated in the IGMP Membership Report; and
   identifying the host designated in the IGMP Membership Report as an alternate host for the multicast stream designated in the IGMP Membership Report in response to determining that the multicast stream is active via a different host than the host designated in the IGMP Membership Report;
   performing a proactive expedited leave process in response to determining that implementation of the requested multipoint leaf connection is required and that required network resources are unavailable; and
   performing a multicast leaf connection implementation process for implementing the requested multipoint leaf connection in response to determining that required network resources are available.

2. The method of claim 1 wherein determining whether the multicast stream designated in the IGMP Membership Report is already active includes assessing entries in a reference table identifying active multicast sessions.

3. The method of claim 2 wherein assessing entries includes assessing a host address, a particular class D address and a multicast subscriber identity.

4. The method of claim 3 wherein facilitating the response-mode determination process further includes canceling any active membership query timers associated with the particular class D address and multicast subscriber identity.

5. The method of claim 1 wherein identifying the host includes creating an entry in a reference table identifying active multicast sessions.

6. The method of claim 5 wherein creating the entry includes designating a host address, a particular class D address and a multicast subscriber identity.

7. The method of claim 1 wherein performing the proactive expedited leave process includes:
   determining whether a host designated in the IGMP Membership Report is a sole member of at least one other multicast session;
   terminating a chosen active leaf connection associated with said at least one other multicast session in response to determining that the host designated in the IGMP Membership Report is the sole member of said at least one other multicast session; and
   removing an entry associated with the chosen active leaf connection from a reference table identifying active multicast sessions.

8. The method of claim 7, further comprising:
   determining whether requested multipoint leaf connection is capable of being implemented after performing the proactive expedited leave process.

9. The method of claim 7 wherein the chosen active leaf connection is a highest bit rate active leaf connection.

10. The method of claim 1, further comprising:
    performing a passive expedited leave process for leaving a multicast group corresponding to the requested multipoint leaf connection in response to implementing the requested multipoint leaf connection.

11. A method for processing Internet Group Management Protocol (IGMP) messages, comprising:
    receiving an IGMP Membership Report designating a requested multipoint leaf connection;

assessing entries in a reference table identifying active multicast sessions for determining whether a multicast stream designated in the IGMP Membership Report is already active;

creating an entry in a reference table identifying active multicast sessions for identifying the host designated in the IGMP Membership Report as an alternate host for the multicast stream designated in the IGMP Membership Report in response to determining that the multicast stream is active via a different host than the host designated in the IGMP Membership Report;

determining whether a host designated in the IGMP Membership Report is a sole member of at least one other multicast session in response to determining that implementation of the requested multipoint leaf connection is required and that required network resources are unavailable;

terminating a highest bit rate active leaf connection associated with said at least one other multicast session in response to determining that the host designated in the IGMP Membership Report is the sole member of said at least one other multicast session;

removing an entry associated with the highest bit rate active leaf connection from a reference table identifying active multicast sessions; and facilitating a multicast leaf connection implementation process for implementing the requested multipoint leaf connection in response to determining that required network resources are available.

12. A method for facilitating a proactive group membership leave process, comprising:

determining whether a host designated in the IGMP Membership Report is a sole member of at least one other multicast session after performing a first process for assessing connection admission;

terminating a chosen active leaf connection associated with said at least one other multicast session in response to determining that the host designated in the IGMP Membership Report is the sole member of said at least one other multicast session;

removing an entry associated with the highest bit rate active leaf connection from a reference table identifying active multicast sessions; and performing a second process for assessing connection admission of the requested multipoint leaf connection after terminating the highest bit rate active leaf connection.

13. A computer-readable medium encoded with a data processor program for processing Internet Group Management Protocol (IGMP) messages, the data processor program enabling functionality comprising:

facilitating a response-mode determination process after receiving an IGMP Membership Report designating a requested multipoint leaf connection comprising;
 determining whether a multicast stream designated in the IGMP Membership Report is already active;
 disregarding the IGMP Membership Report in response to determining that the multicast stream is active via a host designated in the IGMP Membership Report; and
 identifying the host designated in the IGMP Membership Report as an alternate host for the multicast stream designated in the IGMP Membership Report in response to determining that the multicast stream is active via a different host than the host designated in the IGMP Membership Report;

facilitating a proactive expedited leave process in response to determining that implementation of the requested multipoint leaf connection is required and that required network resources are unavailable; and facilitating a multicast leaf connection implementation process for implementing the requested multipoint leaf connection in response to determining that required network resources are available.

14. The computer-readable medium of claim 13 wherein the data processor program further enabling functionality comprising assessing entries in a reference table identifying active multicast sessions.

15. The computer-readable medium of claim 14 wherein the data processor program further enabling functionality comprising assessing a host address, a particular class D address and a multicast subscriber identity.

16. The computer-readable medium of claim 14 wherein the data processor program further enabling functionality comprising canceling any active membership query timers associated with the particular class D address and the multicast subscriber identity.

17. The computer-readable medium of claim 13 wherein the data processor program further enabling functionality comprising creating an entry in a reference table identifying active multicast sessions.

18. The computer-readable medium of claim 17 wherein the data processor program further enabling functionality comprising designating a host address, a particular class D address and a multicast subscriber identity.

19. The computer-readable medium of claim 13 wherein the data processor program further enabling functionality comprising:

determining whether a host designated in the IGMP Membership Report is a sole member of at least one other multicast session;

terminating a chosen active leaf connection associated with said at least one other multicast session in response to determining that the host designated in the IGMP Membership Report is the sole member of said at least one other multicast session; and removing an entry associated with the chosen active leaf connection from a reference table identifying active multicast sessions.

20. The computer-readable medium of claim 19 wherein the data processor program further enabling functionality comprising:

determining whether requested multipoint leaf connection is capable of being implemented after performing the proactive expedited leave process.

21. The computer-readable medium of claim 19 wherein the chosen active leaf connection is a highest bit rate active leaf connection.

22. The computer-readable medium of claim 13 wherein the data processor program further enabling functionality comprising:

facilitating a passive expedited leave process for leaving a multicast group corresponding to the requested multipoint leaf connection after implementing the requested multipoint leaf connection.

* * * * *